(12) United States Patent
Cain, Jr. et al.

(10) Patent No.: US 9,256,672 B2
(45) Date of Patent: Feb. 9, 2016

(54) RELEVANCE CONTENT SEARCHING FOR KNOWLEDGE BASES

(75) Inventors: Clyde L. Cain, Jr., Raleigh, NC (US); Feng-Wei Chen, Cary, NC (US); Ju Y. Lee, Durham, NC (US); Margaret H. Mago, Durham, NC (US); Nikhil R. Parekh, Raleigh, NC (US); William D. Reed, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 1192 days.

(21) Appl. No.: 12/253,097

(22) Filed: Oct. 16, 2008

(65) Prior Publication Data

US 2010/0114886 A1 May 6, 2010

(51) Int. Cl.
*G06F 17/30* (2006.01)

(52) U.S. Cl.
CPC .... *G06F 17/30731* (2013.01); *G06F 17/30672* (2013.01)

(58) Field of Classification Search
CPC .................. G06F 17/30672; G06F 17/30864
USPC ...................................... 707/1, 3, 5, 737, 706
See application file for complete search history.

(56) References Cited

U.S. PATENT DOCUMENTS

| | | | |
|---|---|---|---|
| 5,940,821 A * | 8/1999 | Wical | 707/3 |
| 7,870,117 B1 * | 1/2011 | Rennison | 707/706 |
| 2008/0005148 A1 * | 1/2008 | Welch et al. | 707/102 |
| 2008/0154873 A1 * | 6/2008 | Redlich et al. | 707/5 |
| 2009/0083232 A1 * | 3/2009 | Ives et al. | 707/3 |

* cited by examiner

*Primary Examiner* — Apu Mofiz
*Assistant Examiner* — Chelcie Daye
(74) *Attorney, Agent, or Firm* — Steven M. Greenberg, Esq.; CRGO LAW

(57) ABSTRACT

Embodiments of the present invention provide a novel and non-obvious method, server and computer program product for finding relevant content in a knowledge base. A method for finding items that are related to a user selected item in a knowledge base is provided. The method can include generating a first list of knowledge base items with a defined relationship to the user selected item and generating a second list of knowledge base items that belong to the same category as a category of the user selected item. The method can further include generating a third list of knowledge base items having one or more tags identical to one or more tags of the user selected item and selecting a first set of knowledge base items that are present in the first, second or third lists. The method can further include displaying the first set of knowledge base items as most relevant.

11 Claims, 2 Drawing Sheets

RELEVANCE CONTENT SEARCHING FOR KNOWLEDGE BASES

BACKGROUND OF THE INVENTION

1. Field of the Invention

The present invention relates to knowledge bases, and more particularly to improved methods for finding relevant content in knowledge bases.

2. Description of the Related Art

A knowledge base is a type of system for knowledge management. It provides the means for the computerized collection, organization, and retrieval of knowledge in a particular area. Typically, knowledge bases have carefully written articles, pages, documents or items that are kept up to date, an information retrieval system (such as a search engine), and a carefully designed content format and classification structure. A knowledge base may further use an ontology to specify its structure (entity types and relationships) and classification scheme. An ontology, together with a set of instances of its classes, constitutes a knowledge base.

Users of a knowledge base often desire to find content that is relevant to a given page, article, document or other knowledge base item (collectively referred to as "knowledge base item"). A knowledge base search engine is typically used to perform this function. Knowledge base search engines parse a given knowledge base item into keywords. The search engine compares the search terms, i.e., keywords with the keywords within other items in the knowledge base and determines whether the search terms match or are found within any of the items within the knowledge base. When a match is found, a list of the items that matches the search terms is displayed for the user. The returned list is typically presented without any structure. Typically, knowledge base search engines return any item containing a keyword that is found anywhere within the items. However, knowledge base search engines are unable to always return results that are relevant to the knowledge base item in which the user was initially interested.

There are other limitations with present knowledge base search engines and the methods by which knowledge bases being accessed by these search engines provide data to the requestor. For example, knowledge base search engines often return a long list of search results containing a lot of noise items. Junk results often greatly out-number the results in which the user is interested, and the results of interest are occasionally embedded deep within the list of provided results. From the user's perspective, the results of such searches often are too large to investigate, while at the same time the results do not contain enough relevant items to be useful. Most users are only willing to look at the first few tens of results. Further, no assistance is given by the search engine to help the user understand how the resulting items relate to each other, or to the task that the user is trying to accomplish. Thus, the results of such searches are often unusable because hundreds of items are returned but the type of information presented in each item is unspecified.

In order to provide more information about knowledge base items, users may create links between items. Links can be useful. However, links don't indicate why items were linked. This decreases the value of a link in discerning the relevance of an item. Another common method of providing more information about knowledge base items involves using metadata. Content providers may create metadata along with content, in addition to including links to other knowledge base items having the same metadata. Although this arrangement may be used to show similarities between items, this approach can often lead to search results that include unrelated content.

BRIEF SUMMARY OF THE INVENTION

Embodiments of the present invention address deficiencies of the art in respect to knowledge bases and provide a novel and non-obvious method, server and computer program product for finding relevant content in a knowledge base. In one embodiment of the invention, a method for finding items that are related to a user selected item in a knowledge base is provided. The method can include generating a first list of knowledge base items with a defined relationship to the user selected item and generating a second list of knowledge base items that belong to the same category as a category of the user selected item. The method can further include generating a third list of knowledge base items having one or more tags identical to one or more tags of the user selected item and selecting a first set of knowledge base items that are present in the first list, the second list and the third list. The method can further include displaying the first set of knowledge base items as most relevant.

In another embodiment of the invention, a computer program product comprising a computer usable medium embodying computer usable program code for finding items that are related to a user selected item in a knowledge base comprising is provided. The computer program product includes computer usable program code for generating a first list of knowledge base items with a defined relationship to the user selected item and generating a second list of knowledge base items that belong to the same category as a category of the user selected item. The computer program product further includes computer usable program code for generating a third list of knowledge base items having one or more tags identical to one or more tags of the user selected item and selecting a first set of knowledge base items that are present in the first list, the second list and the third list. The computer program product further includes computer usable program code for displaying the first set of knowledge base items as most relevant.

In another embodiment of the invention, a server for finding items that are related to a user selected item in a knowledge base comprising is provided. The server includes a data repository for storing a plurality of knowledge base items, wherein relationships may be defined between items and wherein an item may be associated with a category and at least one tag. The server further includes a processor configured for generating a first list of knowledge base items with a defined relationship to the user selected item, generating a second list of knowledge base items that belong to the same category as a category of the user selected item, generating a third list of knowledge base items having one or more tags identical to one or more tags of the user selected item and selecting a first set of knowledge base items that are present in the first list, the second list and the third list. The server further includes a display for displaying the first set of knowledge base items as most relevant.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention address deficiencies of the art in respect to knowledge bases and provide a novel and non-obvious method, server and computer program product for finding relevant content in a knowledge base. Relationships may be defined between items and an item may be associated with a category and at least one tag. The method for finding items that are related to a user selected item in a knowledge base includes generating a first list of knowledge base items with a defined relationship to the user selected item and generating a second list of knowledge base items that belong to the same category as a category of the user selected item. Then, a third list of knowledge base items having one or more tags identical to one or more tags of the user selected item is generated. Next, a first set of knowledge base items that are present in the first list, the second list and the third list is selected. Finally, the first set of knowledge base items is displayed as most relevant.

Figure 1:
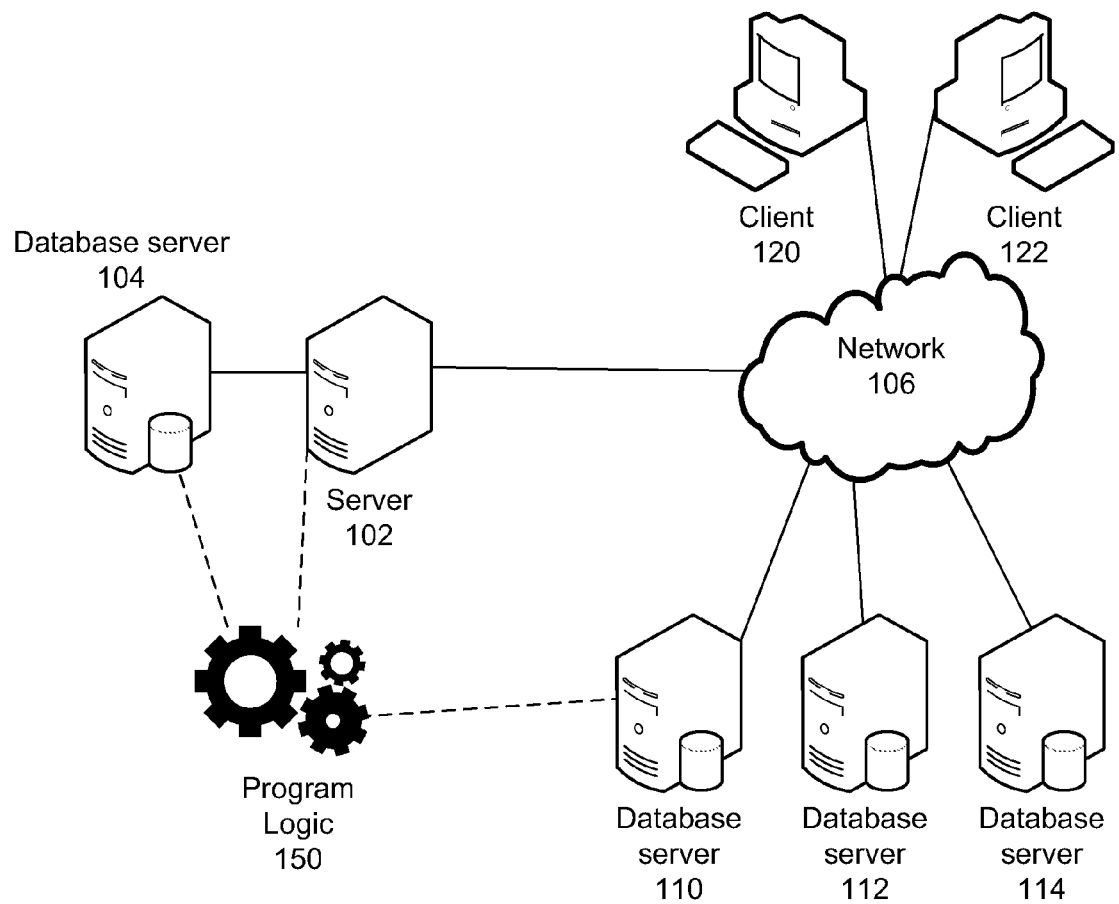
FIG. 1 is a block diagram illustrating a network architecture for a knowledge base system for finding items that are related to a user selected item in the knowledge base, according to one embodiment of the present invention.

FIG. 1 is a block diagram illustrating a network architecture for a knowledge base system for finding items that are related to a user selected item in the knowledge base, according to one embodiment of the present invention. The exemplary embodiments of the present invention adhere to the system architecture of FIG. 1. FIG. 1 shows an embodiment of the present invention wherein program logic 150 executing on computer or server 102 manages a knowledge base comprising database server 104 directly connected to server 102. Alternatively, the knowledge base further comprises a distributed paradigm including database servers 110, 112 and 114 available over a network 106.

FIG. 1 shows clients 120-122 connected to server 102 over network 106 via computers, such as desktop personal computers, workstations or servers. Clients 120-122 access server 102 over the network 106 so as to access items in the knowledge base and perform various functions such as finding items that are related to a user selected item in the knowledge base.

The database server 104 serves data from a database, which is a repository for data used by server 104 during the course of operation. The data served by database server 104 is described in greater detail below. The database of database server 104 may adhere to any one of the flat model, hierarchical model, object-oriented model or a relational model for databases. The database server 104 may also include a database management system, which is an application that controls the organization, storage and retrieval of data (fields, records and files) in the database. A database management system accepts requests for data from the server 102, and instructs the operating system to transfer the appropriate data. The database management system may also control the security and integrity of the database. Data security prevents unauthorized users from viewing or updating certain portions of the database. The description above for database server 104 also applies to database servers 110, 112 and 114.

It should be noted that although FIG. 1 shows the distributed computing environment comprising only server 102, database servers 104, 110-114 and client computers 120-122, the system of the present invention supports any number of servers and computers as comprising the distributed computing environment.

In an embodiment of the present invention, the computer systems of server 102 and database servers 104, 110-114 are one or more Personal Computers (PCs), Personal Digital Assistants (PDAs), hand held computers, palm top computers, lap top computers, smart phones, game consoles or any other information processing devices. A PC can be one or more IBM or compatible PC workstations running a Microsoft Windows or LINUX operating system, one or more Macintosh computers running a Mac OS operating system, or an equivalent. In another embodiment, the computer systems are a server system, such as SUN Ultra workstations running a SunOS operating system or IBM RS/6000 workstations and servers running the AIX operating system.

In an embodiment of the present invention, the network 106 is a circuit switched network, such as the Public Service Telephone Network (PSTN). In another embodiment, the network 106 is a packet switched network. The packet switched network is a wide area network (WAN), such as the global Internet, a private WAN, a local area network (LAN), a telecommunications network or any combination of the above-mentioned networks. In yet another embodiment, the structure of the network 106 is a wired network, a wireless network, a broadcast network or a point-to-point network.

FIG. 1 further shows program logic 150 comprising computer source code, scripting language code or interpreted language code that is compiled to produce computer instructions that perform various functions of the present invention. Specifically, the program logic 150 includes computer instructions that facilitate finding items that are related to a user selected item in the knowledge base. Program logic 150 may be located on server 102, database server 104, database server 110 or any combination of the foregoing.

The data stored in the knowledge base 104 (or, alternatively, 104 and 110-114) comprises knowledge base items such as pages, articles, text documents, hypertext documents, or images, sounds or videos. A knowledge base item can include a relationship that is defined between items. One example of a relationship between items includes the statement that one item is a "case study of" another item or that one item is a "document of" another item. Another example of a relationship between items includes the statement that one item is a "component of" another item or that one item is "supported by" another item. Another example of a relationship between items includes the statement that one item has a "process of" another item. In this way, an ontology can be defined for the items in the knowledge base 104.

An ontology is a representation of a set of concepts within a domain and the relationships between those concepts. An ontology is used to reason about the properties of that domain, and may be used to define the domain. In the present invention, the knowledge base items are the concepts. The ontology of the present invention may include attributes of the knowledge base items, such as properties, features, characteristics, or parameters that knowledge base items can have. The ontology of the present invention may also include relations that include the ways knowledge base items can be related to one another.

A knowledge base item can also include one or more categories and at least one tag. A taxonomy is a hierarchical structure, typically related by subtype-supertype relationships, also called parent-child relationships. In subtype-supertype relationships, the subtype has by definition the same attributes and/or constraints as the supertype plus one or more additional attributes and/or constraints. A tag is a (relevant) keyword or term associated with or assigned to an item, thus describing the item and enabling keyword-based classification and search of information. Tags can be chosen by the item author/creator or by its consumer/viewers/community. Typically, an item will have one or more tags associated with it.

Figure 2:
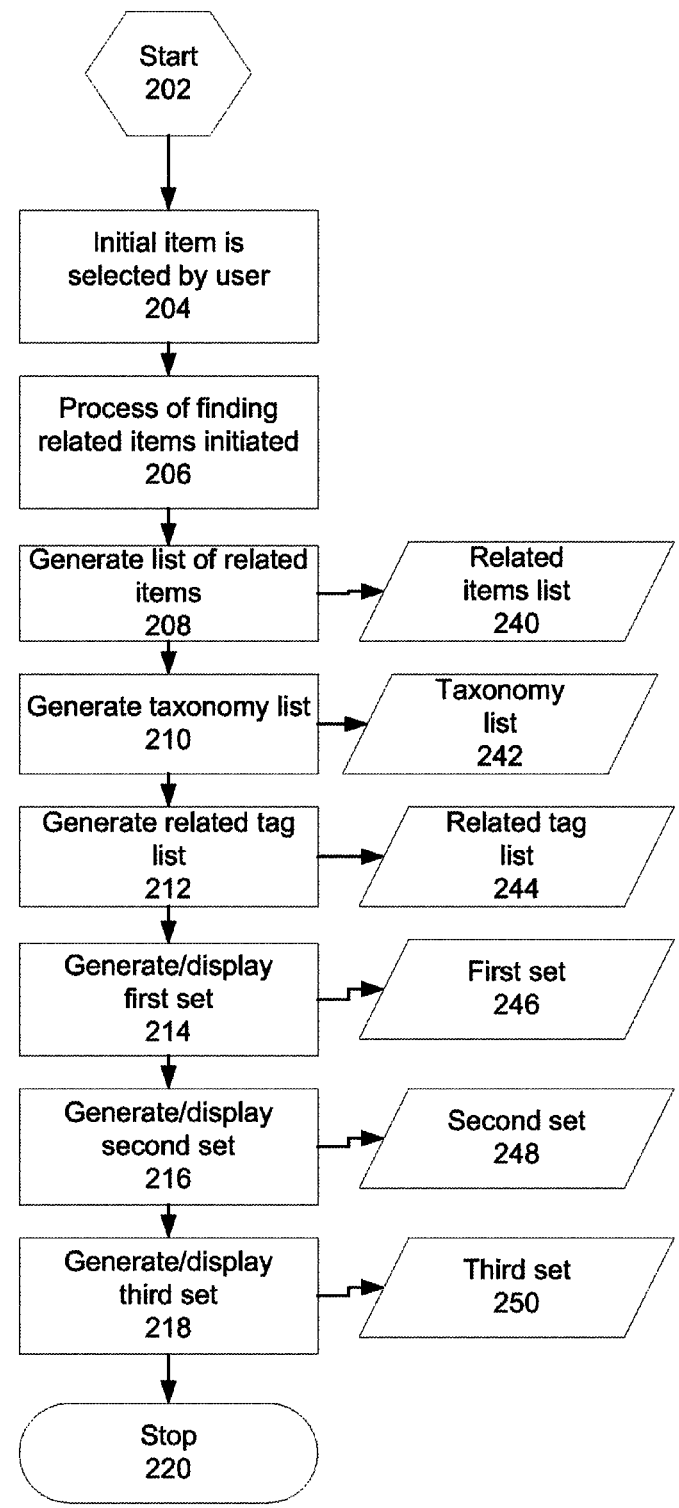
FIG. 2 is a flow chart depicting the control flow for finding items that are related to a user selected item in the knowledge base, according to one embodiment of the present invention.

FIG. 2 is a flow chart depicting the control flow for finding items that are related to a user selected item in the knowledge base, according to one embodiment of the present invention. The control flow of FIG. 2 begins with step 202 and moves directly to step 204. In step 204, an initial knowledge base item is selected, such as by a user via a user interface such as a web browser. In step 206, the process of finding knowledge base items that are related to the initial knowledge base item is initiated, such as on a page load or by a user clicking a button or link on the web browser.

In step 208, a first list 240 of knowledge base items with a defined relationship to the initial knowledge base item is generated. This step can be accomplished by iterating through the items in the knowledge base and selecting those items that have a relationship to the initial knowledge base item.

In step 210, a second list 242 of knowledge base items that belong to the same category or categories as the initial knowledge base item is generated. This step can be accomplished by reading the category or categories of the initial knowledge base item and then iterating through the items in the knowledge base and selecting those items that are associated with the same category or categories the initial knowledge base item.

In step 212, a third list 244 of knowledge base items that have one or more tags identical to the one or more tags of the initial knowledge base item is generated. This step can be accomplished by reading the one or more tags of the initial knowledge base item and then iterating through the items in the knowledge base and selecting those items that are associated with the same tags as the initial knowledge base item.

In step 214, a first set 246 of knowledge base items that are present in the first list, the second list and the third list is selected. Also in step 214, the first set of knowledge base items are displayed on the user interface as most relevant to the initial knowledge base item.

In step 216, a second set 248 of knowledge base items that are present in any two of the first, second and third lists is selected. Also in step 216, the second set of knowledge base items are displayed on the user interface as secondarily relevant to the initial knowledge base item. In one embodiment of the present invention, any items that are already present in the first set are not selected for the second set. Further, items of the second set may be ranked according to the lists on which they were present. Presence on the first list provides the highest ranking, followed by presence on the second list and finally presence on the third list.

In step 218, a third set 250 of knowledge base items that are present in any one of the first, second and third lists is selected. Also in step 218, the third set of knowledge base items are displayed as least relevant. In one embodiment of the present invention, any items that are already present in the first or second set are not selected for the third set. Further, items of the second set may be ranked according to the lists on which they were present. Presence on the first list provides the highest ranking, followed by presence on the second list and finally presence on the third list.

In step 220, the control flow of FIG. 2 ceases.

In one embodiment of the present invention, graphical aids can be presented to the user so as to illustrate the relationships of the first list, the categories of the second list and the tags of the third list. For example, for any knowledge base item displayed to the user, the user may be provided with an icon that, when clicked, spawns another window that provides a graphical representation of the relationships that exist between the clicked item and any other knowledge base item. In another example, for any knowledge base item displayed to the user, the user may be provided with an icon that, when clicked, spawns another window that provides a graphical representation of the categories to which the clicked item belongs. In another example, for any knowledge base item displayed to the user, the user may be provided with an icon that, when clicked, spawns another window that provides a graphical representation of the tags associated with the clicked item.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for finding items that are related to a user selected item in a knowledge base, comprising:
   generating by a processor of a computer three lists including a first list of knowledge base items with a defined relationship to a user selected item in a knowledge base communicatively coupled to the computer,
   a second list of knowledge base items that belong to the same category as a category of the user selected item, and
   a third list of knowledge base items having one or more tags identical to one or more tags of the user selected item;
   selecting by the processor a first set of knowledge base items that are present in all three lists and further selecting by the processor a second set of knowledge base items that are present in only two of the three lists, and yet further selecting by the processor a third set of knowledge base items that are present in only one of the three lists; and
   displaying in a computer display the first set of knowledge base items as most relevant to the user selected item and displaying in the computer display the second set of knowledge base items as secondarily relevant compared to the knowledge base items present in all three lists and displaying in the computer display the third set of knowledge base items as least relevant compared to the knowledge base items present in all three lists and the knowledge base items present in only two of the three lists.

2. The method of claim 1, wherein the step of selecting further comprises:
   selecting by the processor a second set of knowledge base items that are present in only two of the first list, the second list and the third list, and wherein any knowledge base items in the second set are not present in the first set.

3. The method of claim 1, wherein the step of selecting further comprises:
   selecting by the processor a third set of knowledge base items that are present in only one of the first list, the second list and the third list, and wherein any knowledge base items in the third set are not present in either the first set or the second set.

4. The method of claim 1, wherein the step of displaying further comprises:
   displaying in the computer display in a user interface a set of information associated the first set of knowledge base items, wherein the first set is displayed as most relevant to the user selected item.

5. A computer program product comprising a non-transitory computer usable storage medium storing computer usable program code for finding items that are related to a user selected item in a knowledge base comprising:
   computer usable program code for generating a first list of knowledge base items with a defined relationship to a user selected item in a knowledge base,
   a second list of knowledge base items that belong to the same category as a category of the user selected item, and
   a third list of knowledge base items having one or more tags identical to one or more tags of the user selected item;
   computer usable program code for selecting by the processor a first set of knowledge base items that are present in all three lists and further selecting by the processor a second set of knowledge base items that are present in only two of the three lists, and yet further selecting by the processor a third set of knowledge base items that are present in only one of the three lists; and
   computer usable program code for displaying the first set of knowledge base items as most relevant to the user selected item and displaying in the computer display the second set of knowledge base items as secondarily relevant compared to the knowledge base items present in all three lists and displaying in the computer display the third set of knowledge base items as least relevant compared to the knowledge base items present in all three lists and the knowledge base items present in only two of the three lists.

6. The computer program product of claim 5, wherein the computer usable program code for selecting further comprises:
   computer usable program code for selecting a second set of knowledge base items that are present in only two of the first list, the second list and the third list, and wherein any knowledge base items in the second set are not present in the first set.

7. The computer program product of claim 5, wherein the computer usable program code for selecting further comprises:
   computer usable program code for selecting a third set of knowledge base items that are present in only one of the first list, the second list and the third list, and wherein any knowledge base items in the third set are not present in either the first set or the second set.

8. The computer program product of claim 5, wherein the computer usable program code for displaying further comprises:
   computer usable program code for displaying in a user interface a set of information associated the first set of knowledge base items, wherein the first set is displayed as most relevant.

9. A server for finding items that are related to a user selected item in a knowledge base, comprising:
   repository for storing a plurality of knowledge base items, wherein relationships may be defined between items and wherein an item may be associated with a category and at least one tag;
   a processor configured for:
      generating a first list of knowledge base items with a defined relationship to a user selected item in a knowledge base of the repository,
   a second list of knowledge base items that belong to the same category as a category of the user selected item, and
   a third list of knowledge base items having one or more tags identical to one or more tags of the user selected item; and
      selecting a first set of knowledge base items that are present in all lists and further selecting a second set of knowledge base items that are present in only two of the three lists, and yet further selecting a third set of knowledge base items that are present in only one of the three lists; and
   a computer display configured for displaying the first set of knowledge base items as most relevant to the user selected item and displaying the second set of knowledge base items as secondarily relevant compared to the knowledge base items present in all three lists and displaying the third set of knowledge base items as least relevant compared to the knowledge base items present in all three lists and the knowledge base items present in only two of the three lists.

10. The server of claim 9, wherein any knowledge base items in the second set are not present in the first set.

11. The server of claim 9, wherein any knowledge base items in the third set are not present in either the first set or the second set.

\* \* \* \* \*